(12) United States Patent
Staples

(10) Patent No.: US 10,197,049 B2
(45) Date of Patent: Feb. 5, 2019

(54) PORTABLE STORAGE DEVICE FOR BICYCLE TOOLS

(71) Applicant: D3 Innovation Inc., Squamish (CA)

(72) Inventor: Jonathan Staples, Squamish (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 15/624,708

(22) Filed: Jun. 16, 2017

(65) Prior Publication Data

US 2017/0292507 A1    Oct. 12, 2017

Related U.S. Application Data

(60) Provisional application No. 62/350,920, filed on Jun. 16, 2016.

(51) Int. Cl.
| | |
|---|---|
| *B62K 19/42* | (2006.01) |
| *F04B 33/00* | (2006.01) |
| *B60C 23/10* | (2006.01) |
| *B62J 11/02* | (2006.01) |
| *B62K 19/32* | (2006.01) |
| *B62K 19/40* | (2006.01) |

(52) U.S. Cl.
CPC .......... *F04B 33/005* (2013.01); *B60C 23/105* (2013.01); *B62J 11/02* (2013.01); *B62K 19/32* (2013.01); *B62K 19/42* (2013.01); *B62K 19/40* (2013.01)

(58) Field of Classification Search
CPC ....... F04B 33/005; B60C 23/105; B62J 11/02; B62K 19/42; B62K 19/40
See application file for complete search history.

(56) References Cited

U.S. PATENT DOCUMENTS 4,712,592 A * 12/1987 Brown .................. B60C 23/105
                                                          141/98
5,251,341 A    10/1993 Seals
(Continued)

OTHER PUBLICATIONS

Website print-out, https://qwertycycles.co.uk/products/cannondale-tool-head-wrench-7a500 (Jul. 11, 2017). known by Applicant to have been made available to the public in approximately Oct. 2006 by Cannondale Sports Group (www.cannondale.com).

*Primary Examiner* — Joseph M Rocca
*Assistant Examiner* — Marlon A Arce
(74) *Attorney, Agent, or Firm* — Kevin Shipley; Gilbert's LLP

(57) ABSTRACT

The present invention provides a bicycle tool storage device mountable in a bicycle headset assembly and/or a bicycle pump. A top cap for loading a headset assembly and mounting the device is also provided. The top cap includes an annular body and a device receiving aperture extending through the body. The top cap includes a flange extending radially outwardly from a first end of the body and a ridge defined in an inner surface of the body adjacent to the flange. The ridge is concentrically aligned with the aperture for retaining the device. Further still, a bicycle pump for mounting the device is provided. The pump includes a pump body, a handle, a pump head, and a flange. The pump body houses a plunger and a piston. The plunger and handle define a cavity for receiving the device. The handle further defines a flange for retaining the device.

17 Claims, 16 Drawing Sheets

(56) References Cited

U.S. PATENT DOCUMENTS

| | | | |
|---|---|---|---|
| 5,499,858 A * | 3/1996 | Her | B62K 19/42 |
| | | | 280/201 |
| 5,950,498 A | 9/1999 | Gossett | |
| 6,068,330 A * | 5/2000 | Kasuga | B62D 21/15 |
| | | | 188/377 |
| 6,070,897 A * | 6/2000 | Hsieh | B62J 9/02 |
| | | | 206/207 |
| 6,564,982 B1 * | 5/2003 | Woods | B62J 9/001 |
| | | | 224/420 |
| 7,093,844 B2 | 8/2006 | Horiuchi | |
| 7,341,269 B2 | 3/2008 | Horiuchi | |
| 7,396,032 B2 | 7/2008 | Horiuchi | |
| 8,302,981 B1 | 11/2012 | Ma | |
| 8,555,609 B1 | 10/2013 | Chamberlain | |
| 8,727,368 B1 | 5/2014 | Wrobleski | |
| 2012/0000313 A1 * | 1/2012 | Zacks | B62K 19/46 |
| | | | 74/551.8 |
| 2012/0313344 A1 * | 12/2012 | Dal Pozzo | B62J 11/00 |
| | | | 280/288.4 |
| 2014/0102267 A1 * | 4/2014 | Hermansen | B25B 15/008 |
| | | | 81/490 |
| 2014/0165293 A1 * | 6/2014 | Hermansen | B25F 1/02 |
| | | | 7/168 |
| 2016/0264209 A1 * | 9/2016 | DeGray | B62K 21/18 |
| 2017/0157757 A1 * | 6/2017 | Winefordner | B25B 27/0071 |
| 2017/0184083 A1 * | 6/2017 | Wang | F04B 33/005 |

* cited by examiner

PORTABLE STORAGE DEVICE FOR BICYCLE TOOLS

TECHNICAL FIELD

The present invention is in the field of bicycle tool storage. Particular embodiments relate to devices for storing bicycle tools in a headset assembly and/or a bicycle pump.

BACKGROUND

A typical bicycle headset assembly, such as a headset assembly 10 shown in FIGS. 1 and 2, is designed to minimize the degree of 'slack' or 'play' (i.e. the amount of movement) between the components thereof. Headset assembly 10 provides a rotatable interface between a bicycle fork 20 and a head tube 60 of a bicycle frame. Fork 20 has a fork steerer tube 30 coupled at an end 32 to a crown 40. Headset assembly 10 includes a lower bearing 50, an upper bearing 70, and a stem 80. As best seen in FIG. 2, to assemble headset assembly 10, steerer tube 30 of fork 20 is guided through an aperture defined by each of lower bearing 50, head tube 60, upper bearing 70, and stem 80, in that order, such that the apertures are concentrically aligned. To optimize the slack between each of components 20, 50, 60, 70, and 80, headset assembly 10 also includes a top cap 90, a star-fangled nut 92, and a screw 91. Nut 92 is pressed inside steerer tube 30 at an end 34 and is configured so that nut 92 cannot be pulled out of steerer tube 30 through end 34. To remove nut 92 from steerer tube 30, nut 92 must be forced through the entire length of steerer tube 30 and out an aperture 36 defined by crown 40 adjacent end 32. Top cap 90 includes an aperture 93 for receiving screw 91. To remove the slack between the components of headset assembly 10, top cap 90 is positioned on a top surface 82 of stem 80. Headset assembly 10 may include one or more spacers 94 to optimize the axial length of headset assembly 10 to user preferences. For example, headset assembly 10 includes a spacer 94 positioned between top cap 90 and stem 80. Screw 91 is inserted through aperture 93 and then threadedly engaged with a threaded aperture 95 defined by nut 92. As screw 91 is threaded into aperture 95, top cap 90 provides an axial force on top surface 82 of stem 80 and 'loads' bearings 50 and 70. In this way, the slack in headset assembly 10 is minimized for use.

Headset assembly 10 is difficult to adjust in the field where the tools that a typical biker carries while riding are limited. Further, many bikers opt out of carrying many tools or any tools at all. To avoid carrying tools in a backpack or on the biker, some bikers will mount tools to their bikes (for example, to the bike frame). This compromises the aesthetics of the bike and exposes the mounted tools to dirt, debris, and damage. Further, bike tools that are mounted to a bike are susceptible to falling off the bike when a biker is riding and can be easily lost.

FIGS. 3 and 4 show a headset assembly 100 available from Cannondale™. Like headset assembly 10, headset assembly 100 provides a rotatable interface between a bicycle fork 120 and a head tube 160 of a bicycle frame. In contrast with conventional dual-armed forks (such as fork 20), fork 120 only has a single arm 125 to suspend a biker and insulate the biker from the roughness of the terrain that the biker is riding on. Fork 120 further includes a lower clamp 122 and an upper clamp 124. Headset assembly 100 includes single-arm fork 120 and stem 180. Stem 180 includes a steerer tube 130 integrally formed therewith (i.e. steerer tube 130 and stem 180 are fabricated as one-piece).

As best seen in FIG. 4, to assemble headset assembly 100, head tube 160 is positioned between bearings 150 and 170, which are then positioned between clamps 122 and 124 of fork 120 so that the apertures defined by each of clamps 122 and 124, bearings 150 and 170, and head tube 160 are concentrically aligned. Steerer tube 130 is then passed through upper clamp 124, upper bearing 170, head tube 160, lower bearing 150, and lower clamp 122, in that order. To reduce slack in headset assembly 100, an internal surface 135 of a lower end 132 of steerer tube 130 is threaded with threads 136. Threads 136 are threadedly engageable with a bottom cap 190 to remove slack. Bottom cap 190 includes a tubular portion 191 having an upper end 194, a lower end 192, and an axial passageway 193 extending therethrough. Lower end 192 has an annular flange 195 extending readially outwardly from portion 191. Flange 195 has an abutment surface 195*a*. An external surface 191*a* of tubular portion 191 is threaded with thread 196. Bottom cap 190 is inserted through lower clamp 122 of fork 120 and threadedly engaged with steerer tube 130 of stem 180. As threads 136 of steerer tube 130 are threadedly engaged with threads 196 of bottom cap 190, abutment surface 195*a* provides an axial force on lower clamp 122 and 'loads' bearings 150 and 170. In this way, the slack in headset assembly 100 is minimized for use.

Once headset assembly 100 is loaded for use, a tool 110 can be inserted into an aperture 182 defined by stem 180. In this way, tool 110 can be carried by a biker on a bicycle and can be quickly and easily accessed when needed. However, tool 110 is only operable with specialized stem 180. Since other conventional headset assemblies (for example, headset assembly 10) employ a star-fangled nut and bolt to optimize slack, these headset assemblies lack internal space to accommodate tool 110. Accordingly, tool 110 has limited application.

U.S. Pat. Nos. 7,093,844, 7,341,269, and 7,396,032, owned by Shimano Corp., describe bicycle headset assemblies for mounting a steerer tube of a front fork to a head tube of a bicycle frame. The bicycle headset assembliess are configured such that a specified device can be mounted in the steerer tube and the headset assembly appropriately loaded using a tubular member. A bicycle headset assembly 200 according to an example embodiment is shown in FIG. 5. Headset assembly 200 provides a rotatable interface between a front suspension fork 220 and a bicycle frame head tube 260. Headset assembly 200 is configured and arranged to contract in an axial direction on a steerer tube 230 of fork 220 to apply an axial force to bearings 250 and 270 and to secure steerer tube 230 within head tube 260. Since fork 220 is disclosed to preferably be an electronically controlled suspension fork that includes an electric dampening device that changes the dampening characteristics of the fork, the device that is mounted in tubular member 290 of headset assembly 200 is limited to devices for controlling fork 220, such as an electronic suspension controller, a mechanic suspension controller, an electrical switch, or a cycle computer with a display. When mounted inside headset assembly 200, device 290 extends partially into an upper portion of steerer tube 230.

Headset assembly 200 includes a tubular member 290 to optimize slack. Tubular member 290 has a tubular section 291 having an outer peripheral surface 291*a* with a set of external threads 296 for threadedly engaging a set of internal threads 236 of steerer tube 230. When headset assembly 200 is assembled and loaded, as shown in FIG. 5, internal threads 236 of steerer tube 230 extend downwardly away from an annular flange 295 of tubular member 290. Threads 236 extend downwardly beyond stem 280. Threads 236 mechanically weaken steerer tube 230 which poses safety risks to bikers. Having reduced structural integrity, steerer tube 230 is prone to breaking under stress or load. To reduce risk, a thicker steerer tube must be used to compensate for the structural weakness introduced by extensive threading. Since steerer tubes are typically made of a rigid, metallic material, using a thicker steerer tube adds weight to a bicycle and increases manufacturing costs.

In addition to tools for adjusting or repairing a bicycle and the components thereof, most bikers will carry a manual bicycle pump while riding in the event of a leaking or flat tire. A typical bicycle pump functions via a hand-operated piston. During an up-stroke, the piston draws external air through a one-way valve into a pump body. During a down-stroke, the piston displaces the air in the pump body into a bicycle tire. In relatively recent years, bikers have opted to ride mountain bikes having higher volume tube and tire set-ups Since more air is needed to inflate such tubes than lesser volume set-ups, considerable time and energy can be spent to inflate a leaking or flat tube. To save time and energy, many bikers opt to carry or mount a larger volume pump to their bike.

Manual bicycle pumps for storing compressed gas cartridges are known. Such pumps require a user to disassemble the pump to access the cartridge. This renders the pump inoperable until reassembled and exposes the internal components of the pump to dirt and debris. Such exposure can contaminate the pump and render it inoperable. Bicycle pumps for storing other small items, such as tube patches, are known. Such items are typically stored in the pump handle where space is limited. Manual bicycle pumps for storing pump hoses are also known. For example, bicycle pumps for storing pump hoses are sold commercially by Lezyne™. Such pumps include a pump body, a handle, and a pump head. The handle and the pump head are disposed at opposite ends of the pump body. The pump body houses a piston rod and a piston. The piston rod is connected at a first end to the handle for pump actuation and at a second end opposed to the first end to the piston. Such pumps are hand-actuated as is conventionally known by pumping the handle to actuate the piston inside the pump body to draw air into and displace air from the pump body via a one-way valve. The Lezyne™ pumps are inoperable in the absence of a separate hose. The hose includes two connecting ends. A first connecting end is coupleable to a valve of a bicycle tire to be inflated. A second connecting end is coupleable to the pump head for delivering air from the pump body to the tire. The piston rod of such pumps defines a hollow receiving portion for housing the hose. To mount the hose inside the receiving portion, an internal surface of the receiving portion adjacent the handle is threaded and an external surface of a connecting end of the hose is threaded. The hose is installed into the pump by inserting the hose into the receiving portion and screwing the threaded connecting end into the receiving portion. Such pumps include plugs for sealing the pump head and the hose mounted inside the receiving portion when the pump is not in use. These plugs can become easily lost. For example, these plugs are easily dislodged from the pump head and/or the hose when the pump is mounted to a bicycle and the bicycle is in use. Without these plugs, the pump head and the hose would be exposed to dirt and debris which compromise the performance of the pump. Further, when the hose is attached to the pump head, the receiving portion is exposed to dirt and debris. When the hose is later inserted into a contaminated receiving portion, the hose can also become contaminated with dirt and debris impacting the proper function of the pump.

There is a general desire to store a variety of tools and/or personal items on a bicycle and/or in a bicycle pump such that space that is typically not used is utilized and the tools/personal items are easily accessed and/or are not vulnerable to dirt, debris, or damage when the bike is in use.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The devices provided herein address the needs of bikers and provide improvements over existing bicycle tool storage devices. The devices permit a user to store bicycle tools in a bicycle headset assembly and/or a bicycle pump.

One aspect of the invention provides a top cap for loading a bicycle headset assembly. The top cap includes an annular body having a first end, a second end opposed to the first end, and a bicycle tool storage device receiving aperture extending through the body from the first end to the second end. The top cap includes a flange extending radially outwardly from the first end of the body and a ridge defined in an inner surface of the body adjacent to the flange. The ridge is concentrically aligned with the aperture. An inner diameter of the body corresponds to an outer diameter of a bicycle tool storage device.

In some embodiments, an edge of the second end of the body is chamfered or filleted.

In some embodiments, a diameter of the ridge corresponds to a diameter of an O-ring of the bicycle tool storage device for sealingly engaging the O-ring and mounting the bicycle tool storage device inside the top cap.

In some embodiments, at least a portion of the body is threaded adjacent to the first end for threadedly engaging an internally threaded steerer tube of a bicycle fork.

In some embodiments, the top cap includes an internal drive defined in an outer surface of the flange adjacent to the aperture.

Another aspect of the invention provides a bicycle pump including a pump body, a handle, a pump head, and a flange. The pump body houses a plunger and a piston. The handle is disposed at a first end of the pump body and defines an aperture. The pump head is disposed at a second end of the pump body opposed to the first end. The flange is defined by the handle concentric with and adjacent to the aperture. The plunger is connected at a first end to the handle and at a second end to the piston. The plunger and the aperture define a cavity for receiving a bicycle tool storage device.

In some embodiments, a diameter of the cavity corresponds to an outer diameter of the bicycle tool storage device.

In some embodiments, an inner diameter of the flange corresponds to a diameter of an O-ring of the bicycle tool storage device, wherein the O-ring sealingly engages with the flange for mounting the bicycle tool storage device inside the bicycle pump.

Another aspect of the invention provides a bicycle tool storage device including one or more tools, a body for mounting the one or more tools, and a receiving portion outwardly extending from a first end of the body.

In some embodiments, the receiving portion is configured to removeably engage a compressed gas cartridge and/or a container.

In some embodiments, an outer diameter of the body and one or more tools removeably mounted to the body corresponds to an outer diameter of the container.

In some embodiments, an outer diameter of the device corresponds to a diameter of a cavity of a bicycle pump. The bicycle pump includes a pump body, a handle, a pump head, and a flange. The pump body houses a plunger and a piston. The handle is disposed at a first end of the pump body and defines an aperture. The pump head is disposed at a second end of the pump body opposed to the first end. The flange is defined by the handle concentric with and adjacent to the aperture. The plunger is connected at a first end to the handle and at a second end to the piston. The plunger and the aperture define a cavity for receiving a bicycle tool storage device.

In some embodiments, an outer diameter of the device corresponds to a diameter of a bicycle tool storage device receiving portion of a bicycle headset assembly.

In some embodiments, the device includes a flange outwardly extending from a second end of the body. An outer diameter of the flange is greater than the outer diameter of the bicycle tool storage device receiving portion so that the device is easily removed from the bicycle headset assembly.

In some embodiments, an outer diameter of the device corresponds to a diameter of an aperture of a top cap for loading a bicycle headset assembly. The top cap includes an annular body having a first end, a second end opposed to the first end, and a bicycle tool storage device receiving aperture extending through the body from the first end to the second end. The top cap includes a flange extending radially outwardly from the first end of the body and a ridge defined in an inner surface of the body adjacent to the flange. The ridge is concentrically aligned with the aperture. An inner diameter of the body corresponds to an outer diameter of a bicycle tool storage device.

In some embodiments, the device includes a flange outwardly extending from a second end of the body. An outer diameter of the flange is greater than the diameter of the aperture so that the device is easily removed from the top cap.

In some embodiments, the device includes a first O-ring radially and outwardly extending from the body adjacent to a second end of the body.

In some embodiments, the device includes a second O-ring radially and outwardly extending from the body from a position between the first and second ends of the body.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless the context dictates otherwise, the terms "radially outward", "radially outwardly", and/or the like (as used herein) refer to directions that extend generally orthogonal to and away from a central axis 302 or 402 or 602 or, where the context dictates, have components that extend generally orthogonal to and away from central axis 302 or 402 or 602. Unless the context dictates otherwise, the terms "radially inward", "radially inwardly", and/or the like (as used herein) refer to directions that extend generally orthogonal and toward central axis 302 or 402 or 602 or, where the context dictates, have components that extend generally orthogonal to and toward central axis 302 or 402 or 602. Unless the context dictates otherwise, the terms "radial", "radially", and/or the like (as used herein) refer to directions that are either radially inward, radially outward, or both. Although the term "radial" is most commonly used in connection with circular objects or features, it should be understood for the purpose of this description and accompanying aspects that the term "radial" is used in a broader context and is not limited to describing strictly circular objects or features or objects or features with strictly circular cross-section.

The devices described herein generally relate to portable devices for storing bicycle tools, accessories, and other items. Unless the context dictates otherwise, the term "tool" (as used herein) means a hand-held implement used to carry out a particular function and includes, but is not limited to, implements to adjust and/or repair a bicycle or components thereof. The device can be stored in a bicycle headset assembly and/or in a bicycle pump.

Figure 10:
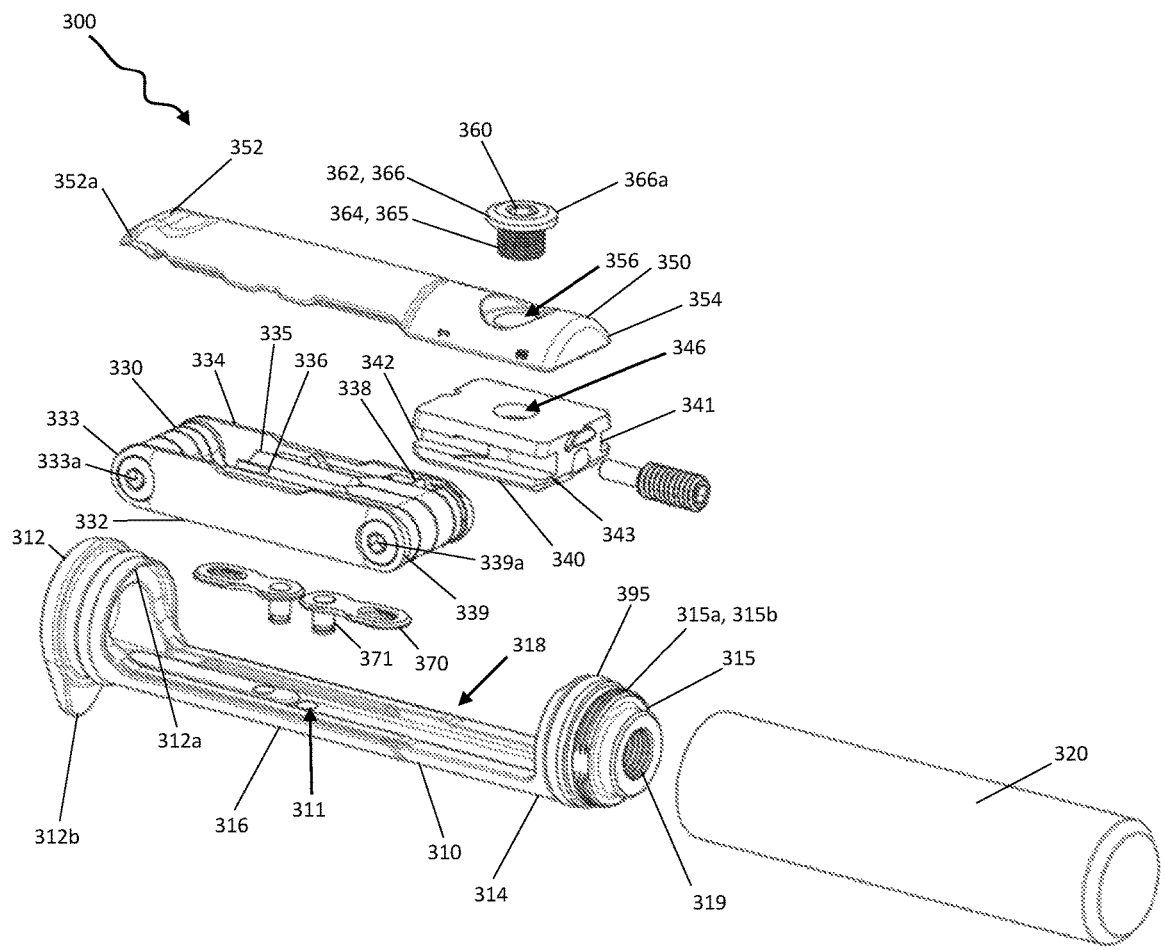
FIG. 10 is an exploded view of the device shown in FIG. 6.
Figure 11:
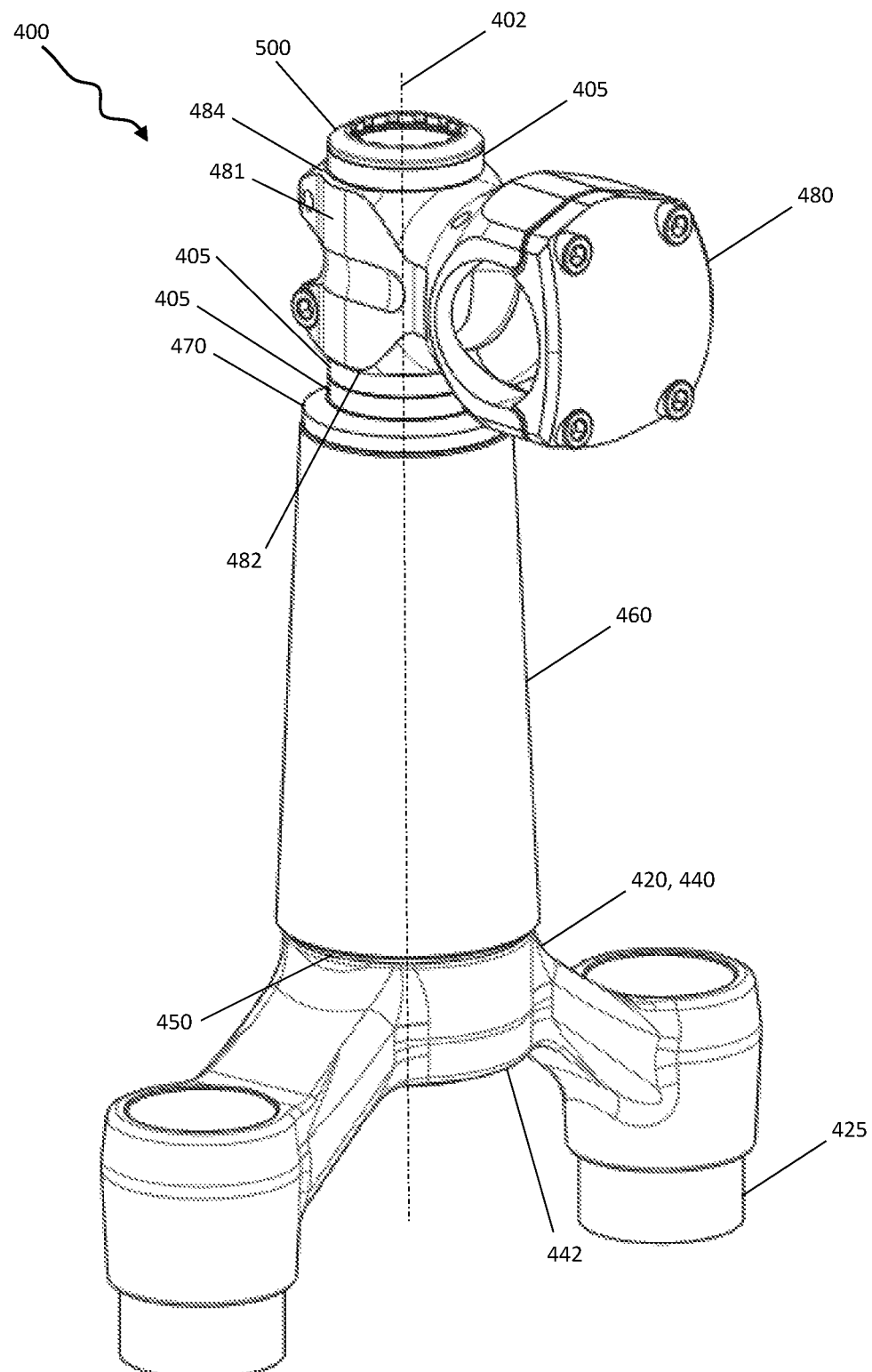
FIG. 11 is a perspective view of a bicycle headset assembly according to an example embodiment of the present invention.

FIGS. 6-10 show various views of a portable device 300, according to an example embodiment. As best shown in FIG. 10, device 300 comprises a body 310 configured to mount one or more tools. Body 310 includes a first end 312 and a second end 314 connected to first end 312 by an elongated mounting arm 316. Body 310 and ends 312 and 314 each have an annular shape about a central axis 302. Although the term "annular" is most commonly used in connection with objects and/or features having circular profiles, it should be understood for the purposes of this description and accompanying claims that the term "annular" is used in a broader context and is not limited to describing circular objects or features of objects or objects or features with strictly circular profiles or cross-sections.

Body 310 defines a receiving portion 315 (FIG. 10) extending axially from end 314. Like body 310, receiving portion 315 is generally annular in cross-section. In some embodiments, device 300 includes a container 320. Container 320 may be removably attached to receiving portion 315 so that a user can store tools and/or accessories and/or other items in device 300 (e.g. a compressed gas cartridge, money, tube patches, chain links, cables, zip ties, etc.). In some embodiments, an outer peripheral surface 315a of receiving portion 315 is threaded with threads 315b for engaging a threaded internal surface (not shown) of container 320. The length of receiving portion 315 may vary. In some embodiments, receiving portion 315 is relatively longer so as to support a relatively longer and/or heavier container 320. In some embodiments, receiving portion 315 should have sufficient axial length to accommodate installation of container 320.

In some embodiments, receiving portion 315 defines a threaded aperture 319 for mounting a compressed gas cartridge (not shown). Typical compressed gas cartridges include a threaded neck for engaging an inflator head. In some embodiments, the axial length of receiving portion 315 and aperture 319 allows the neck of a compressed gas cartridge to be installed into receiving portion 315, thereby accommodating installation of the cartridge. When installed in receiving portion 315, the compressed gas cartridge may be stored inside container 320 for safe keeping, but this is not necessary. In some embodiments, a tubeless tire repair kit (not shown) is attachable to receiving portion 315.

Container 320 is hollow and has an annular shape about central axis 302. Persons skilled in the art will recognize that container 320 may be removably attached to body 310 using any means conventionally known. By way of non-limiting example, container 320 may be snap fit to body 310. Body 310 and/or container 320 may be constructed from a rigid material such as plastic (or other curable material) or metal. Body 310 and/or container 320 may be fabricated using machining, forging, blow molding, injection blow molding, injection molding, extrusion blow molding, extrusion, dye casting, or a like method. In some embodiments, body 310 and/or container 320 may be fabricated using a three-dimensional ("3D") printer.

One or more bicycle tools or other items may be removably mounted to body 310. In the FIG. 6-10 embodiment, a multi-tool 330, a chain breaker 340, a tire lever 350, and a spare chain ring bolt 360 are mounted to body 310 such that device 300 has an annular shape about central axis 302. In some embodiments, an outer diameter of container 320 is substantially similar to an outer diameter of body 310 and the one or more tools or other items mounted thereto. Ends 312 and 314 and arm 316 of body 310 define a space 318 for mounting multi-tool 330, chain breaker 340, tire lever 350, and bolt 360. To assemble device 300, multi-tool 330 is positioned on arm 316 adjacent end 312. Chain breaker 340, removably attached to a second end 354 of tire lever 350 by bolt 360, is positioned on arm 316 adjacent end 314. Multi-tool 330 and chain breaker 340 are dimensioned to occupy a substantial portion of the space defined by ends of 312 and 314 and arm 316 such that, in some embodiments, multi-tool 330 and chain breaker 340 are held frictionally in place. In some embodiments, multi-tool 330 and/or chain breaker 340 are removeably secured to body 310. To secure multi-tool 330 and chain breaker 340 to body 310, a first end 352 of tire lever 350 is configured to frictionally engage end 312 of body 310. In some embodiments, end 352 defines a flange 352a that may be snap-fit inside a ridge 312a defined by end 312. Holding multi-tool 330 on arm 316 adjacent end 312, a user presses flange 352a of tire level 350 into ridge 312a defined by body 310 and presses chain breaker 340 into space 318 to snap-fit chain breaker 340 between multi-tool 330 and end 314. To disassemble device 300 and access one or more bicycle tools and/or other items stored within space 318, a user applies a force to bend arm 316 thereby freeing lip 352a from ridge 312a and releasing multi-tool 330, chain breaker 340, and tire lever 350 from body 310.

Persons skilled in the art will recognize that the tools and/or other items mounted to body 310 may be mounted in any configuration. Also, other tools and/or items may be mounted to body 310. For example, in some embodiments, body 310 includes apertures 311 to accept one or more 'quick connect' chain links 370. Each chain link 370 includes an outwardly extending pin 371 dimensioned to frictionally fit inside aperture 311.

In some embodiments, chain breaker 340 is removably attached to tire lever 350 via bolt 360. Tire lever 350 defines an aperture 356 at a second end 354 thereof. Chain breaker 340 defines a threaded aperture 346. Bolt 360 includes a tubular portion 364 threaded with threads 365. An annular flange 366 extends radially outwardly from a first end 362 of tubular portion 364 Bolt 360 is inserted through aperture 356 of tire lever 350 and threadedly engages aperture 346 of chain breaker 340 to mount chain breaker 340 to tire lever 350. An outer diameter of flange 366 is greater than a diameter of aperture 356 to prevent bolt 360 from passing through tire lever 350 when mounting chain breaker 340 to tire lever 350. Chain breaker 340 and/or tire lever 350 and/or bolt 360 may be constructed from a rigid material such as plastic (or other curable material) or metal. Chain breaker 340 and/or tire lever 350 and/or bolt 360 may be fabricated using machining, forging, blow molding, injection molding, extrusion blow molding, extrusion, dye casting, or a like method. In some embodiments, chain breaker 340 and/or tire lever 350 and/or bolt 360 are fabricated using a 3D printer. In some embodiments, chain breaker 340 includes one or more spoke wrenches 341, 342, and 343, although this is not necessary.

Multi-tool 330 is a portable, versatile hand tool that combines several individual functions in a single unit. Multi-tool 330 includes a first end plate 332 and a second end plate 334, each end plate having a first end 333 and a second end 339. In some embodiments, end plates 332 and 334 are connected at first ends 333 by a first rod 333a and at second ends 339 by a second rod 339a. One or more tools are pivotally mounted to one or both rods. In some embodiments, multi-tool 330 includes one or more hex wrenches 335, a T25 torx key 336, and a cassette tool 338. Hex wrenches 335 include one or more hex wrenches ranging from 2 mm to 8 mm hex wrenches. Persons skilled in the art will recognize that multi-tool 330 may include any number of tools and that the tools may be designed for any number of uses. For example, multi-tool 330 may include a flat head screwdriver. Multi-tool 330 and/or the components thereof may be constructed from a rigid material such as plastic (or other curable material) or metal. Multi-tool 330 and/or the components thereof may be fabricated using machining, forging blow molding, molding, extrusion blow molding, extrusion, dye casting, or a like method. In some embodiments, multi-tool 330 and/or the components thereof may be fabricated using a 3D printer.

Figure 1:
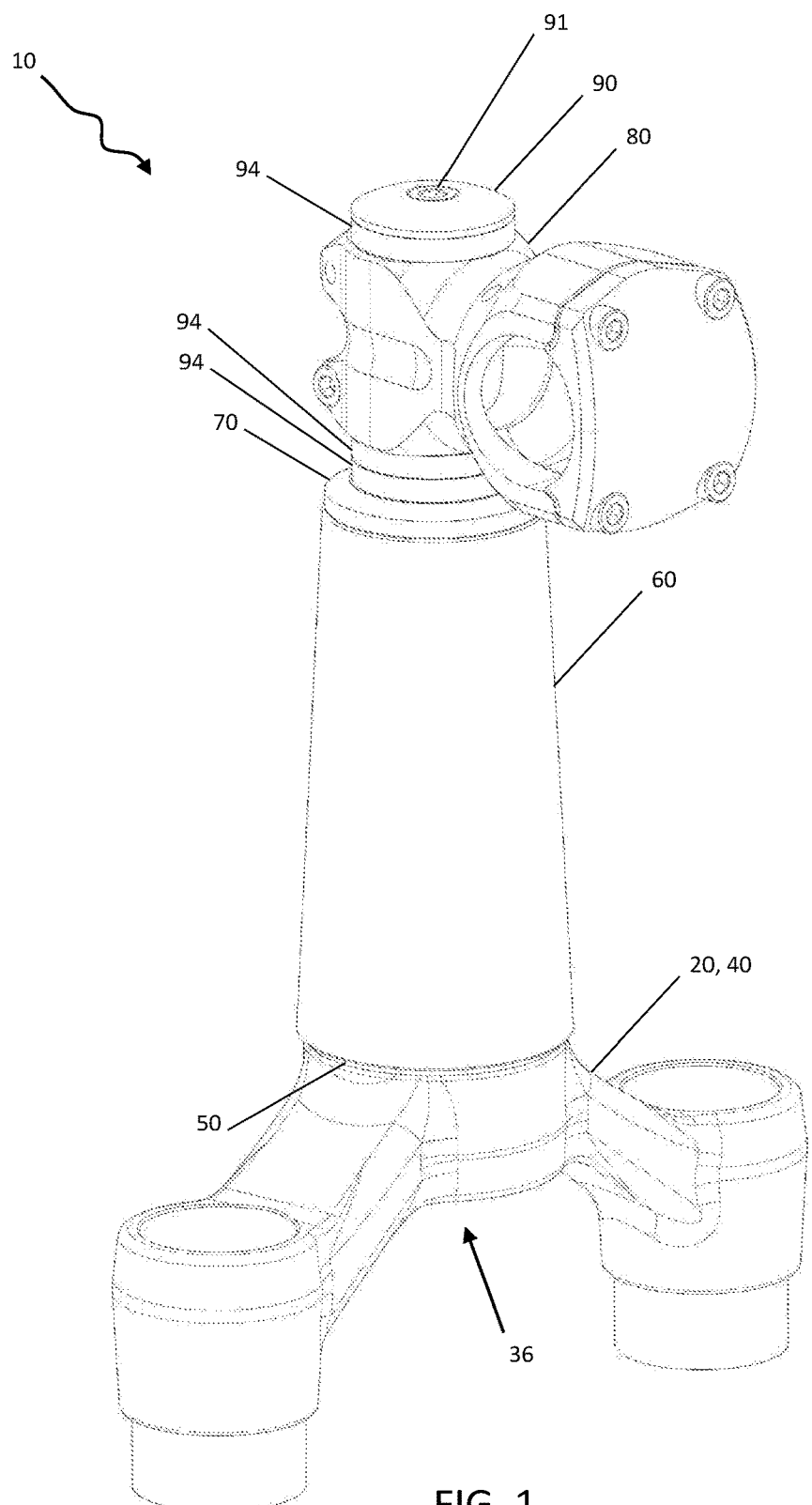
FIG. 1 is a perspective view of a conventional bicycle headset assembly.
Figure 2:
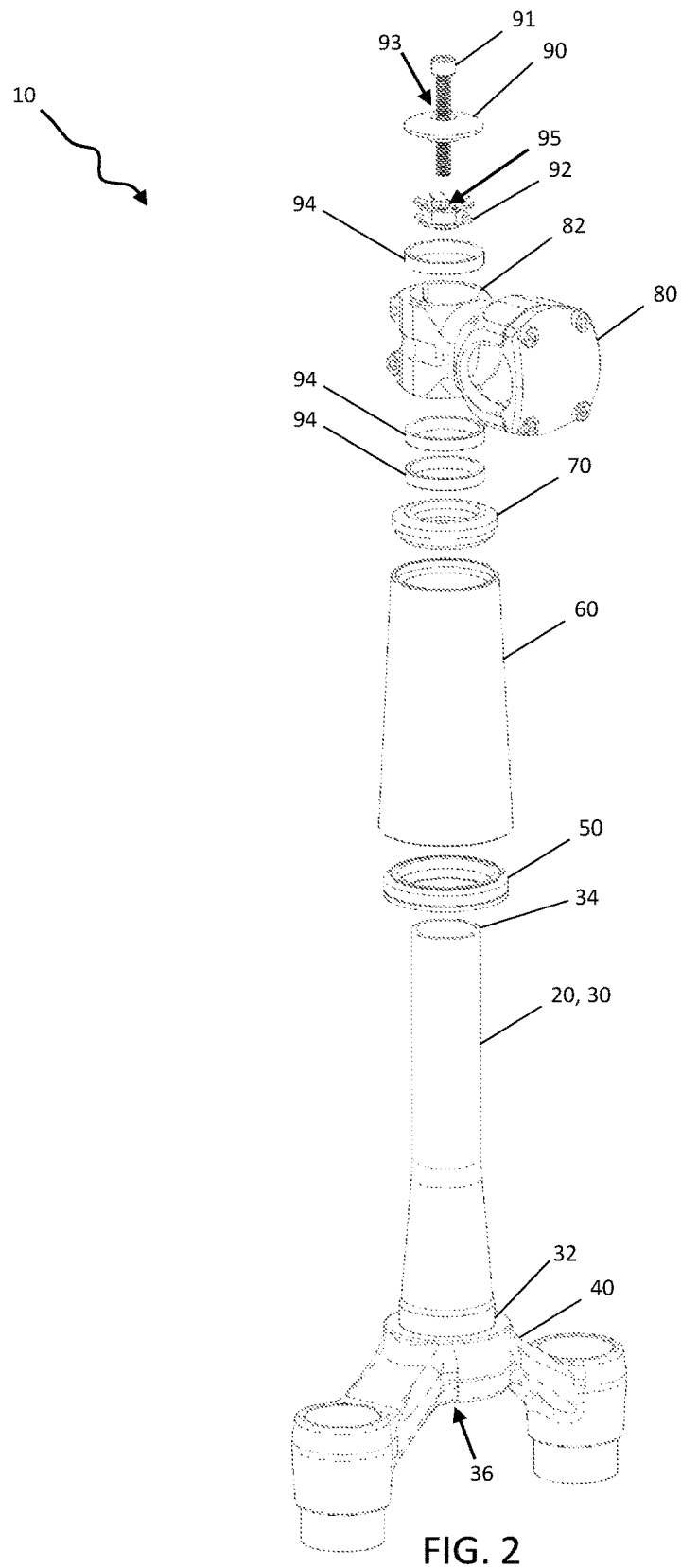
FIG. 2 is an exploded view of the headset assembly shown in FIG. 1.
Figure 3:
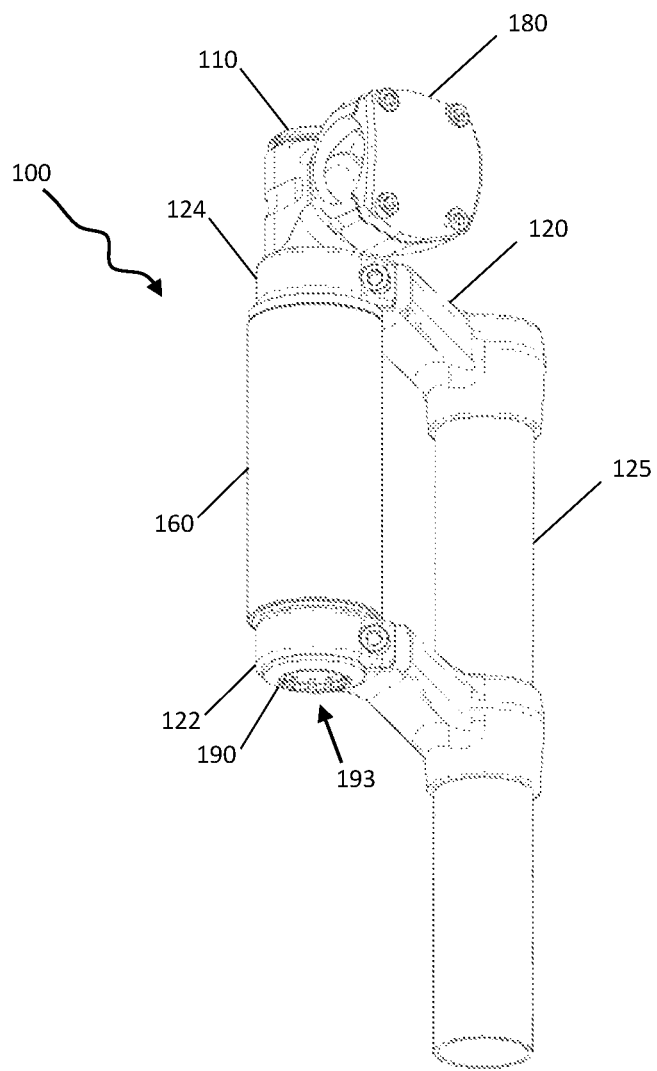
FIG. 3 is a perspective view of a prior art bicycle headset assembly.
Figure 4:
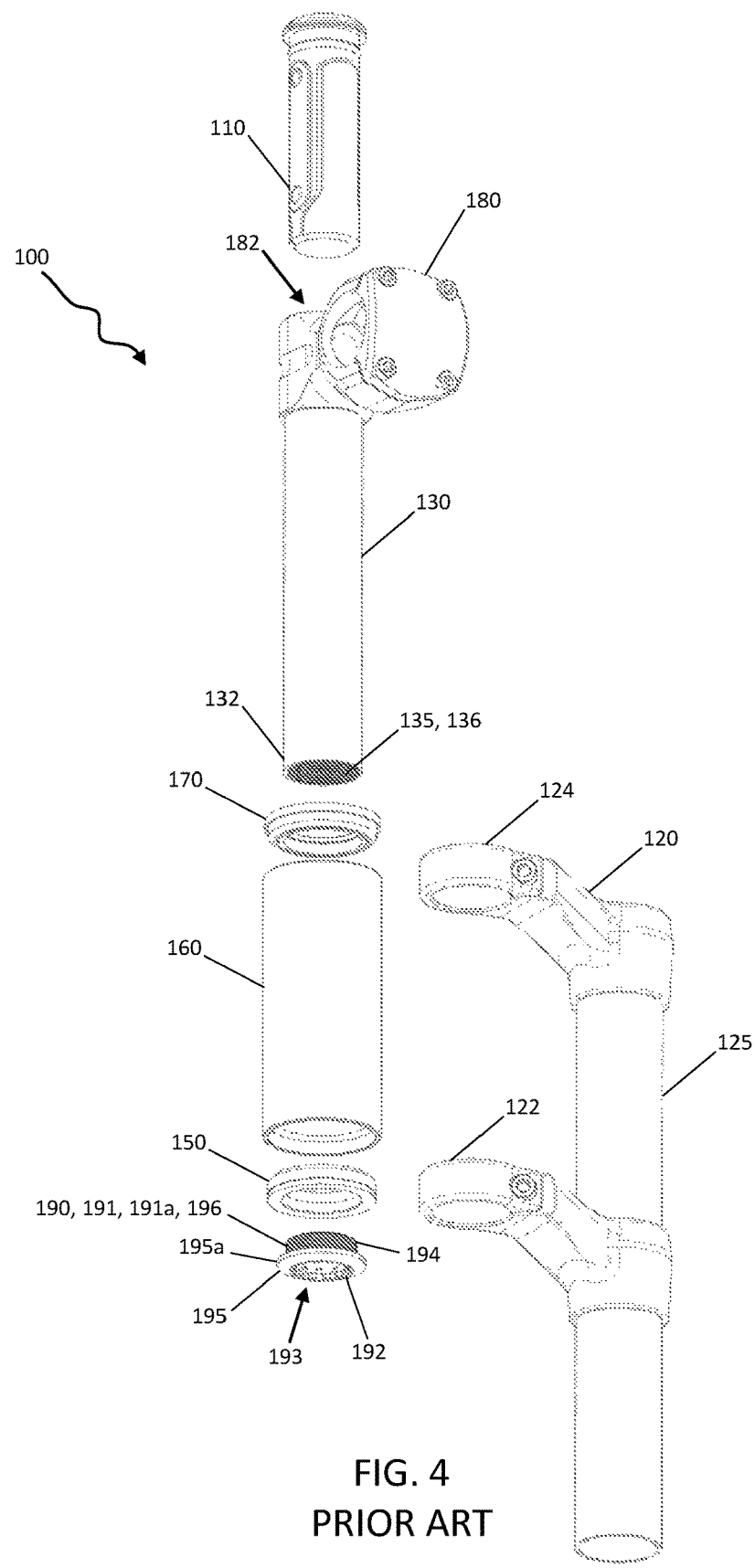
FIG. 4 is an exploded view of the headset assembly shown in FIG. 3.
Figure 5:
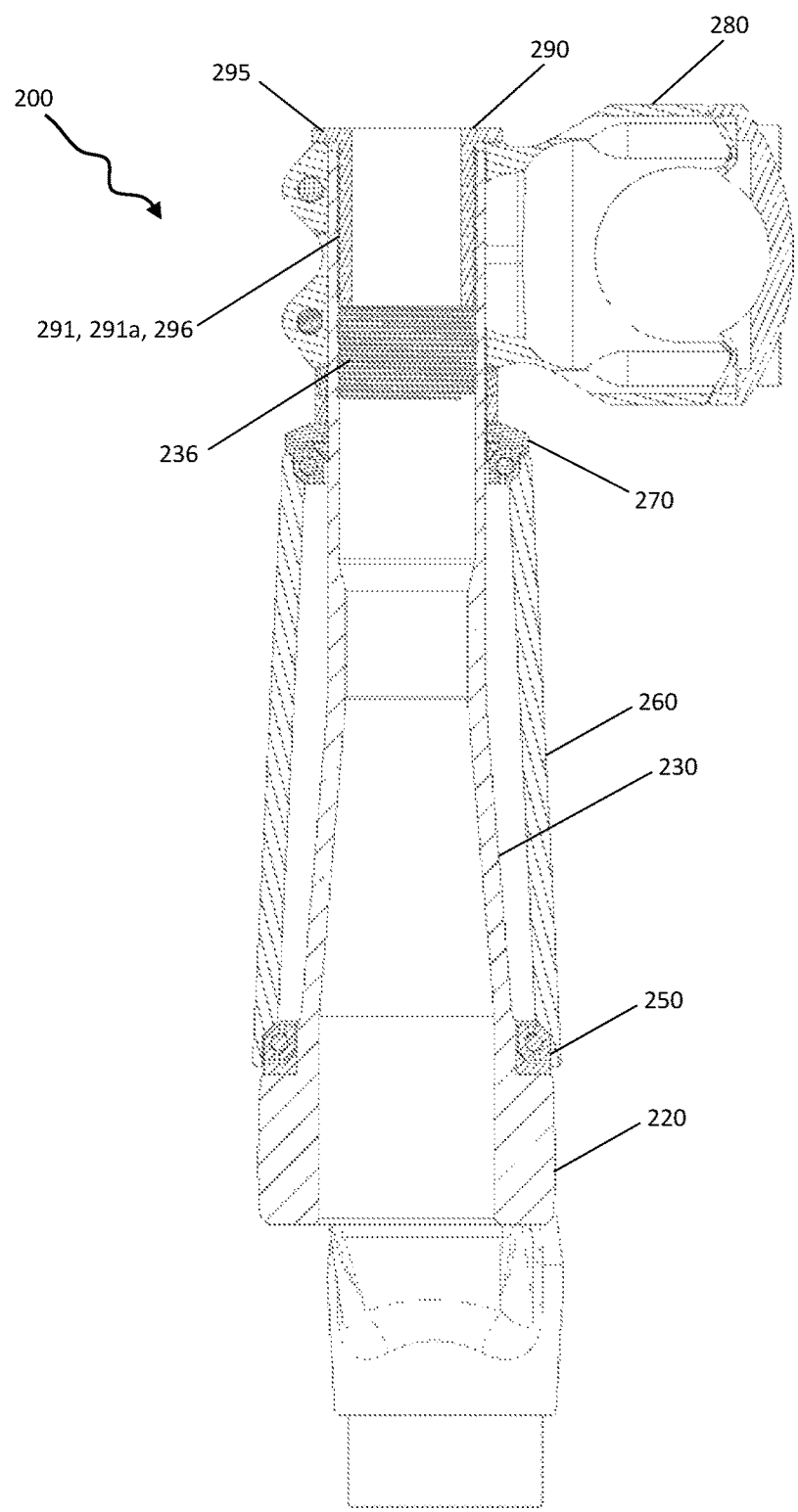
FIG. 5 is a cross-sectional view of a prior art bicycle headset assembly.
Figure 6:
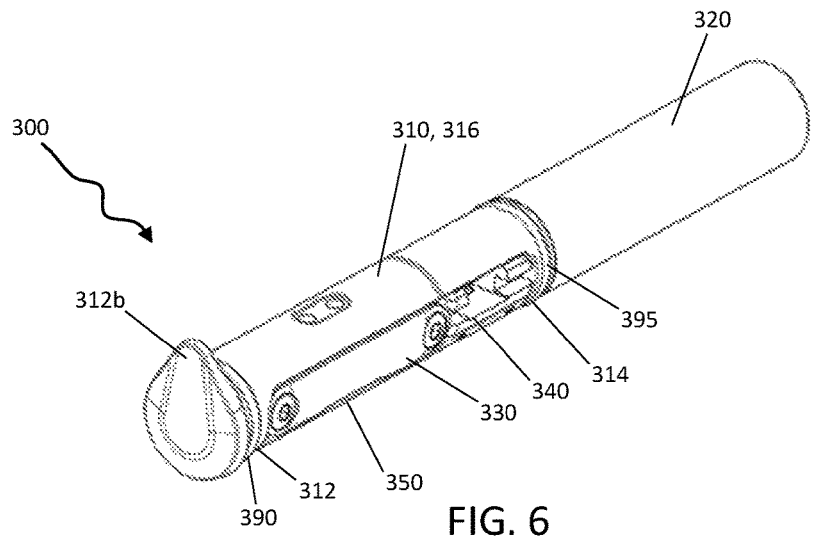
FIG. 6 is a perspective view of a portable bicycle storage device for bicycle tools according to an example embodiment of the present invention.

When assembled as shown in FIG. 6, device 300 is sized and shaped to be stored inside a bicycle headset assembly and/or a hand-actuated bicycle pump. In some embodiments, end 312 of body 310 includes a flange 312b. Flange 312b may act as a handle for removing device 300 from a headset assembly and/or a bicycle pump. Flange 312b may act as a stopper to prevent device 300 from being inserted into a headset assembly and/or a bicycle pump such that device 300 is not easily accessed by a user.

FIGS. 11-15 show various views a bicycle headset assembly 400 according to an example embodiment. Device 300 may be mounted inside headset assembly 400. Headset assembly 400 provides a rotatable interface between a bicycle fork 420 and a head tube 460 of a bicycle frame. Fork 420 has a steerer tube 430 coupled at an end 432 to a crown 440. Fork 420 includes one or more downwardly extending arms 425. Headset assembly 400 includes a lower bearing 450, an upper bearing 470, a stem 480, and a top cap 500. In some embodiments, headset assembly 400 includes one or more spacers 405 to optimize the axial length of headset assembly 400 to user preferences.

Figure 12:
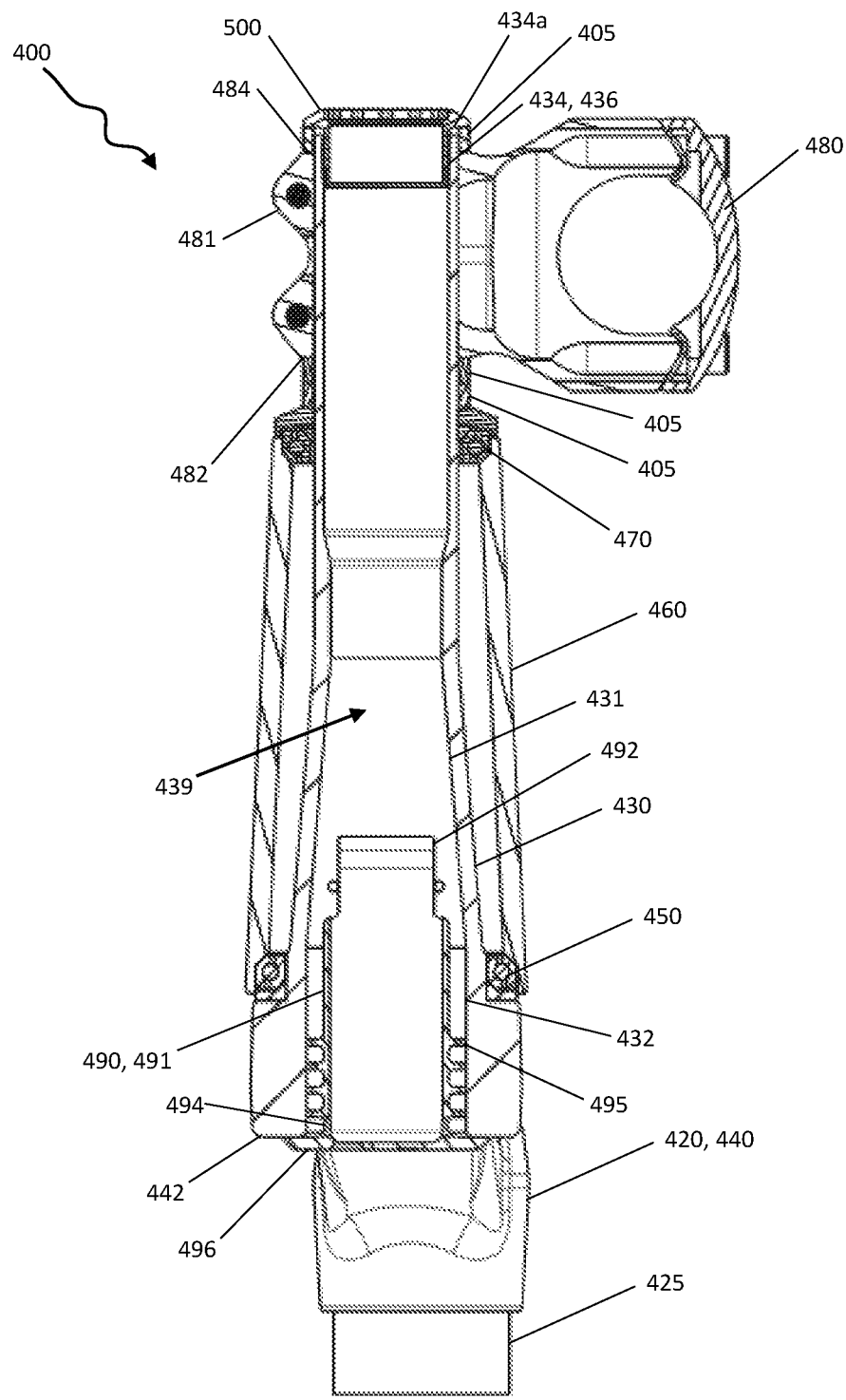
FIG. 12 is a side cross-sectional view of the headset assembly shown in FIG. 11.
Figure 13:
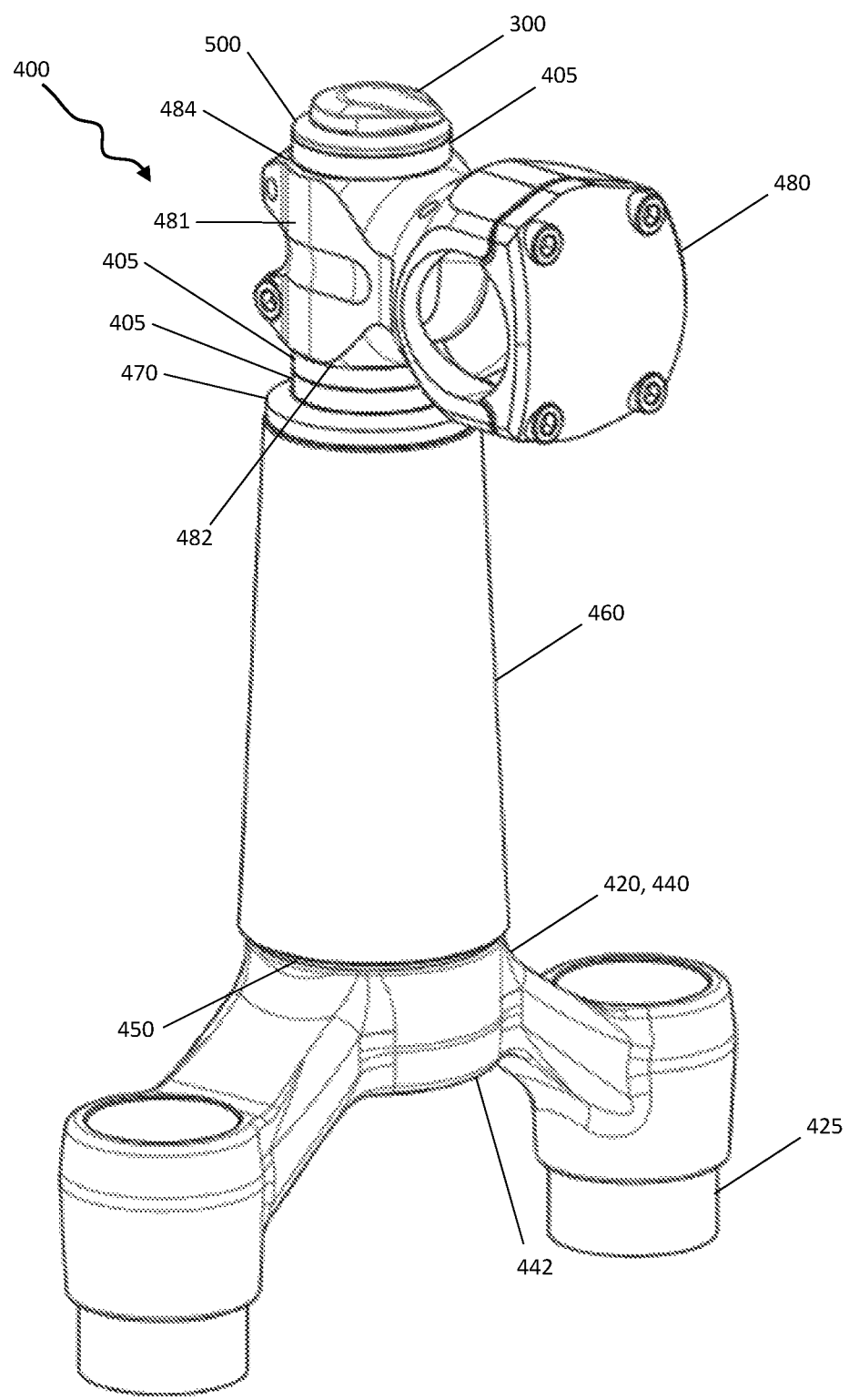
FIG. 13 is a perspective view of the device shown in FIG. 6 removeably mounted inside the headset assembly shown in FIG. 11.
Figure 14:
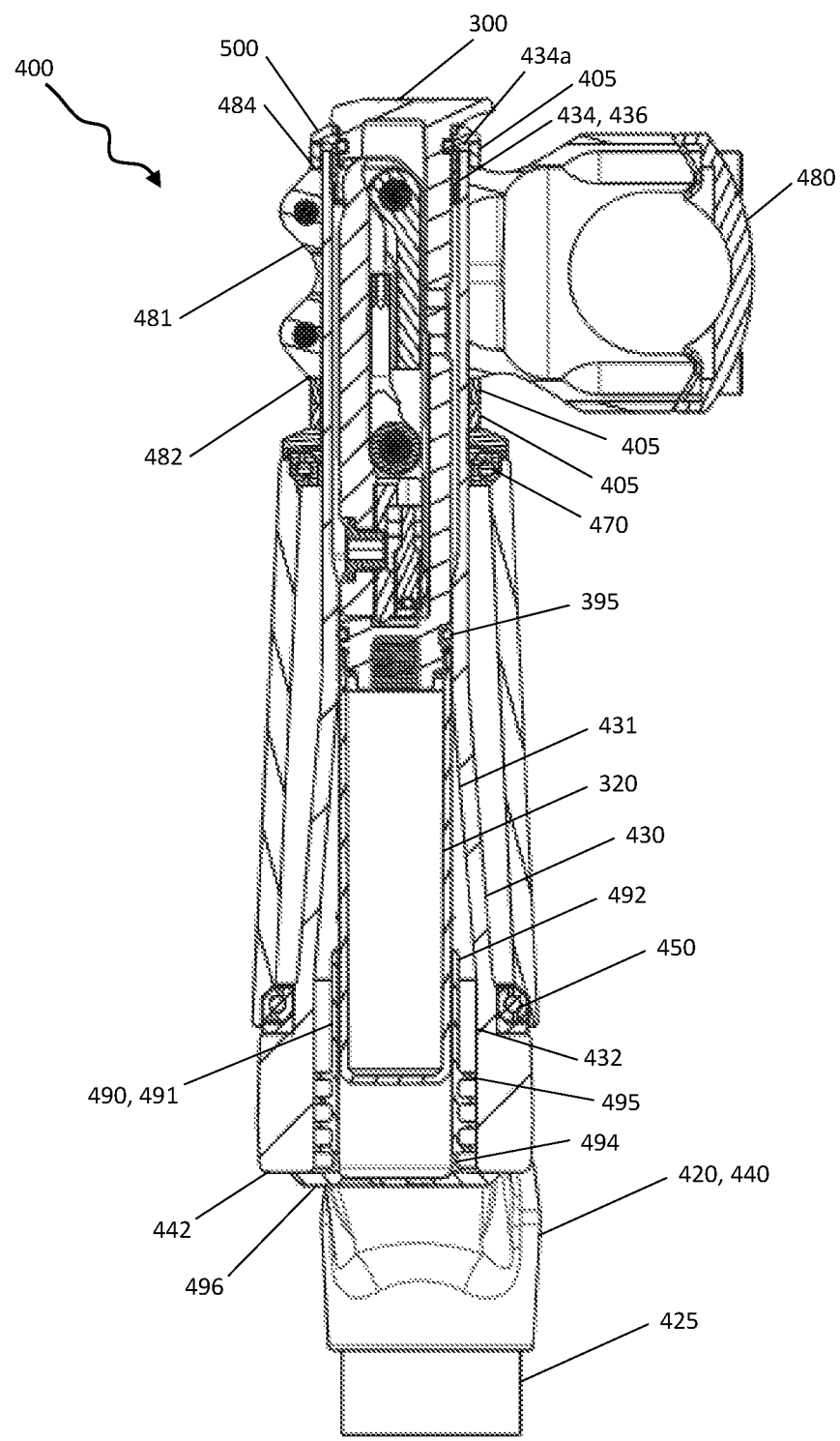
FIG. 14 is a side cross-sectional view of the device shown in FIG. 6 removeably mounted inside the headset assembly shown in FIG. 11.
Figure 15:
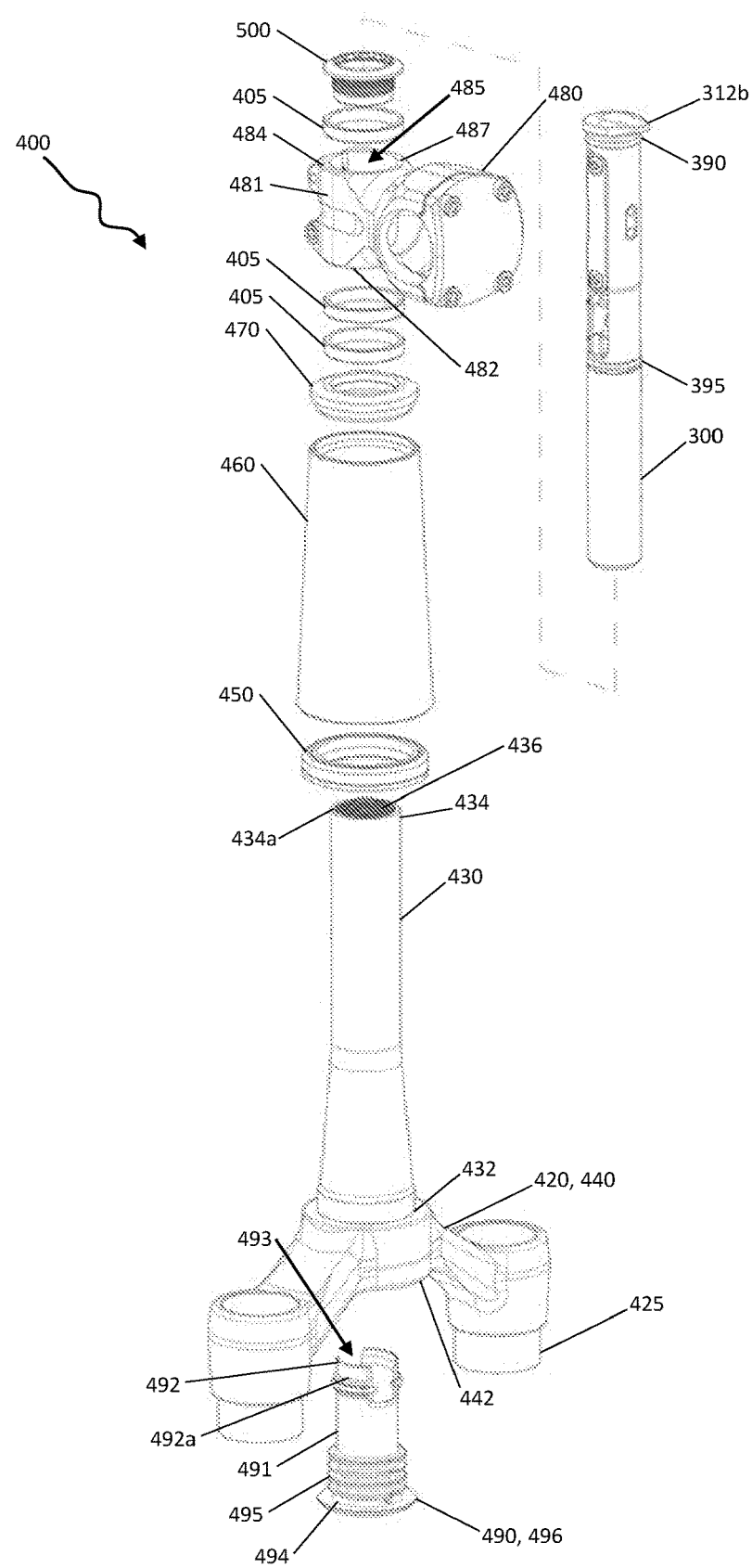
FIG. 15 is an exploded view of the headset assembly shown in FIG. 13.
Figure 16:
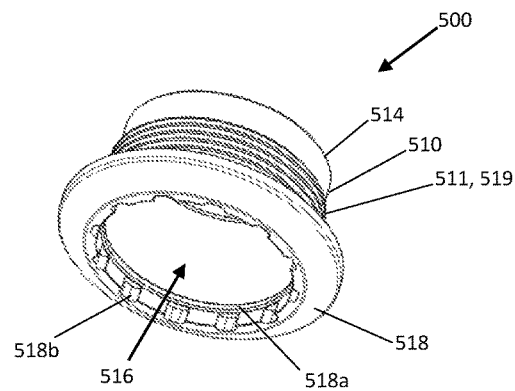
FIG. 16 is a top perspective view of a top cap according to an example embodiment of the present invention.
Figure 17:
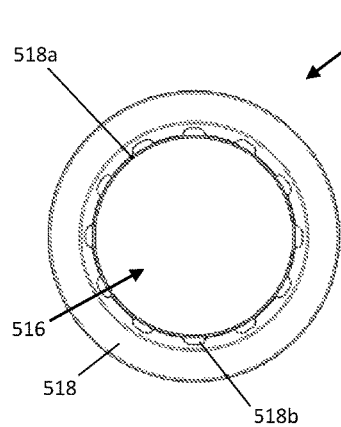
FIG. 17 is a top view of the top cap shown in FIG. 16.
Figure 18:
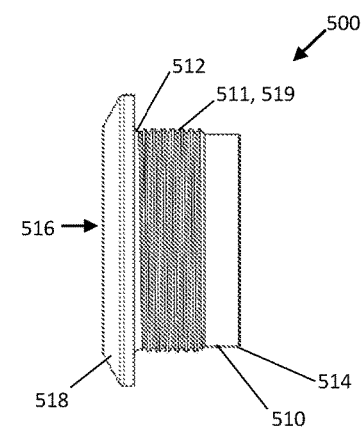
FIG. 18 is a side view of the top cap shown in FIG. 16.
Figure 19:
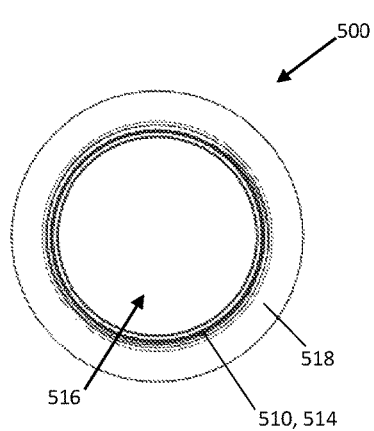
FIG. 19 is a rear view of the top cap shown in FIG. 16.
Figure 20:
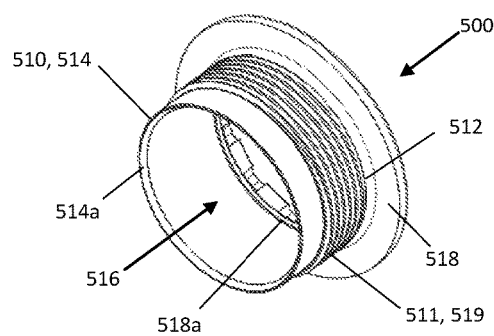
FIG. 20 is a rear perspective view of the top cap shown in FIG. 16.
Figure 21:
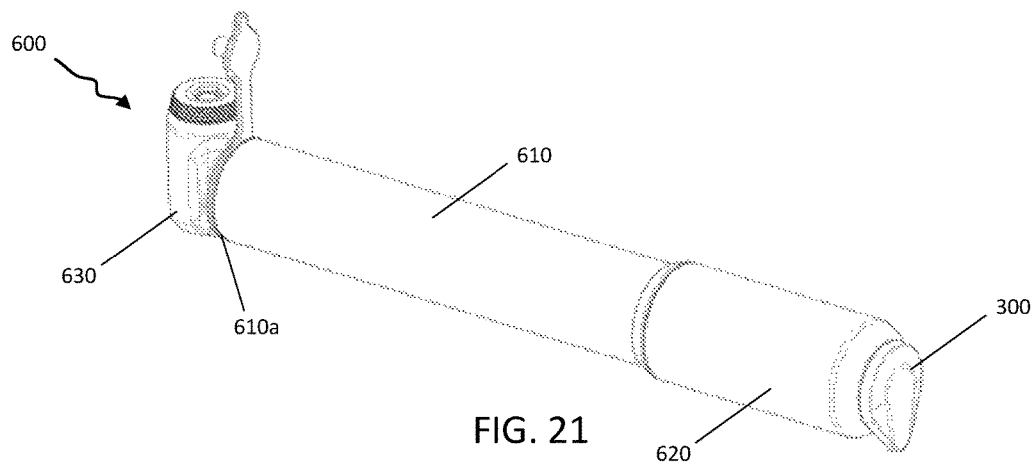
FIG. 21 is a perspective view of a bicycle pump according to an example embodiment of the present invention, wherein the device shown in FIG. 6 is removeably mounted inside the pump.
Figure 22:
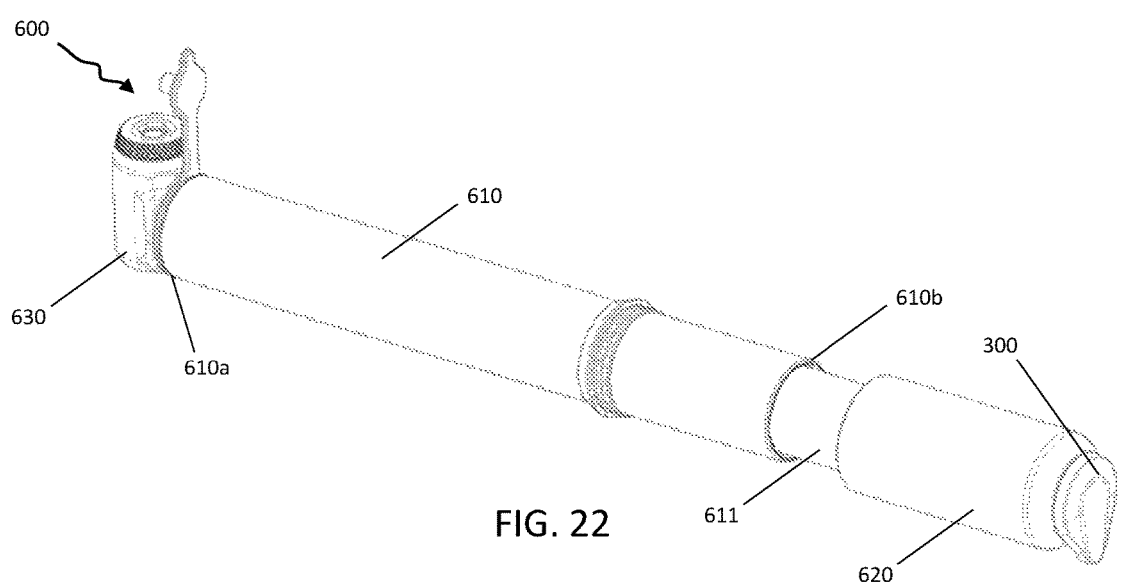
FIG. 22 is a perspective view of the pump shown in FIG. 20 in a partial up-stroke position, wherein the device shown in FIG. 6 is removeably mounted inside the pump.
Figure 23:
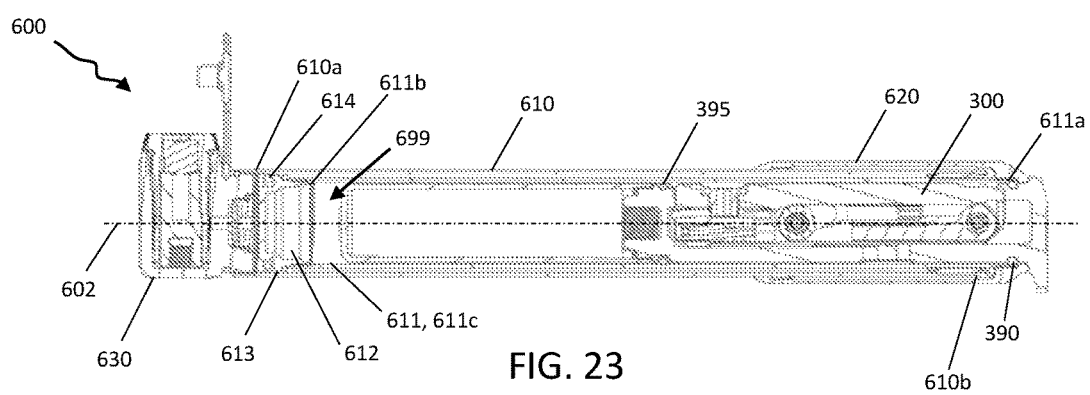
FIG. 23 is a side cross-sectional view of the bicycle pump shown in FIG. 21, wherein the device shown in FIG. 6 is removeably mounted inside the pump.

As best seen in FIG. 15, to assemble headset assembly 400, steerer tube 430 is guided through lower bearing 450, frame tube 460, upper bearing 470, and stem 480, in that order, such that the apertures defined by these components are concentrically aligned. To load headset assembly 400 and reduce the slack between the components thereof, top cap 500 is provided. An inner surface 431 of an upper end 434 of steerer tube 430 is threaded with threads 436 for engaging top cap 500. In some embodiments, a tap guide (not shown) is configured to an outer diameter of steerer tube 430 proximate end 434. A tap (not shown) is then positioned on the tap guide. In this way, the tap is concentrically aligned with steerer tube 430. The tap is concentrically aligned with steerer tube 430 even in the case where a top surface 434a of steerer tube 430 is cut poorly (i.e. unevenly, at an angle other than approximately perpendicular to central axis 402, etc.). A handle (not shown) is used to turn the tap. In some embodiments, the handle is a standard 8 mm hex wrench. In some embodiments, the handle is a standard square screwdriver. To maintain the mechanical strength of steerer tube 430, upper end 434 is threaded only to the extent necessary to engage top cap 500. In some embodiments, less than about 20 mm (0.8 inches) of internal surface 431 of steerer tube 430 is threaded from surface 434a. In some embodiments, upper end 434 of steerer tube 430 is threaded internally from surface 434a to an axial position that is substantially equal to or less than one half of the distance between an upper surface 484 of a steerer tube clamping portion 481 of stem 480 and a lower surface 482 of clamping portion 481. The tap guide and tap may be used to internally thread an upper end of most conventional bicycle forks. As best shown in FIG. 12, when headset assembly 400, is assembled as described elsewhere herein, the portion of steerer tube 430 that extends through stem clamp 481 is not completely threaded with threads 436. Accordingly, steerer tube 430 is less likely to fracture or break in use than a steerer tube that is more extensively internally threaded. This is paramount to biker safety.

Top cap 500 engages threads 436 of steerer tube 430 to load headset assembly 400. FIGS. 16-20 show various views of top cap 500 according to an example embodiment. Top cap 500 includes an annular body 510 having a first end 512 and a second end 514. Body 510 defines an aperture 516 extending from first end 512 to second end 514. An outer surface 511 of body 510 is threaded with threads 519. Top cap 500 includes an annular flange 518 extending radially outwardly from first end 512. Body 510 defines a ridge 518a concentrically aligned with aperture 516 adjacent flange 518. Ridge 518a is configured to receive an O-ring 390 of device 300. An outer diameter of body 510 corresponds to an inner diameter of upper end 434 of steerer tube 430 proximate top surface 434a. An outer diameter of flange 518 is greater than the inner diameter of upper end 434 of steerer tube 430 proximate top surface 434a. In some embodiments, the outer diameter of flange 518 is greater than an outer diameter of an aperture 485 defined by stem 480. Accordingly, flange 518 is sized to abut against upper surface 487 of stem 480. Top cap 500 and/or the components thereof may be constructed from a rigid material such as plastic (or other curable material) or metal. Top cap 500 and/or the components thereof may be fabricated using machining, forging, blow molding, injection molding, extrusion blow molding, extrusion, dye casting, or a like method. In some embodiments, top cap 500 and/or the components thereof may be fabricated using a 3D printer.

To load headset assembly 400, a user screws top cap 500 into upper end 434 of steerer tube 430. As threads 519 of top cap 500 are threadedly engaged with threads 436 of steerer tube 430, flange 518 provides an axial downward force on upper surface 484 of stem 480. This force axially pulls stem 480 and fork 420 together, axially contracting fork 420, bearings 450 and 470, bike frame tube 460, and stem 480 and thereby reducing the slack between these headset assembly components. In some embodiments, flange 518 of top cap 500 includes an internal drive 518b for engaging a tool (not shown) to screw top cap 500 into or unscrew top cap 500 from steerer tube 430. In some embodiments, a conventional cassette tool is engageable with internal drive 518b for engaging/disengaging top cap 500. In some embodiments, multi-tool 330 includes a cassette tool 338 for engaging top cap 500. Persons skilled in the art will recognize that internal drive 518b may be configured to be compatible with other tools conventionally known. Such tools may be carried on multi-tool 330. When top cap 500 is installed in headset assembly 400, a space 439 (FIG. 12) defined by steerer tube 430 is available and accessible to the user through aperture 516 of top cap 500. Since an upper end of most conventional bicycle forks can be internally threaded as described elsewhere herein, top cap 500 is compatible with most forks for loading headset assembly 400.

Once headset assembly 400, is loaded (as described elsewhere herein), device 300 may be installed into space 439 through aperture 516 of top cap 500. In this way, top cap 500 mounts device 300 such that device 300 is quickly and easily accessed by a user when needed. An outer diameter of device 300 corresponds to an inner diameter of body 510. The axial length of device 300 is less than the axial length of space 439. In some embodiments, device 300 includes a flange 312b (described elsewhere herein) to prevent device 300 from passing through aperture 516 when installed into space 439. Flange 312b may act as a handle to assist a user in removing device 300 from top cap 500.

Figure 7:
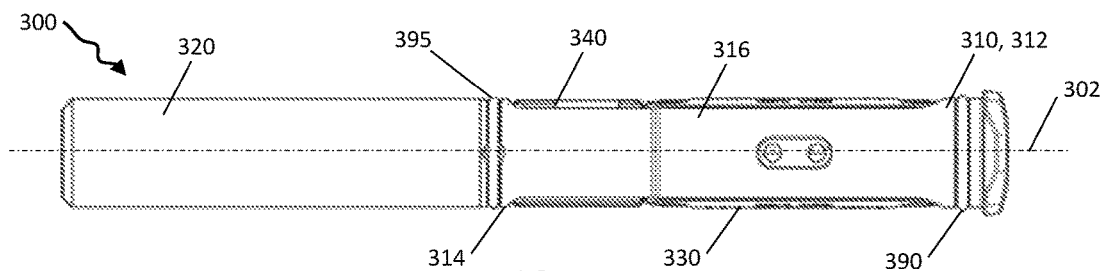
FIG. 7 is a bottom view of the device shown in FIG. 6.
Figure 8:
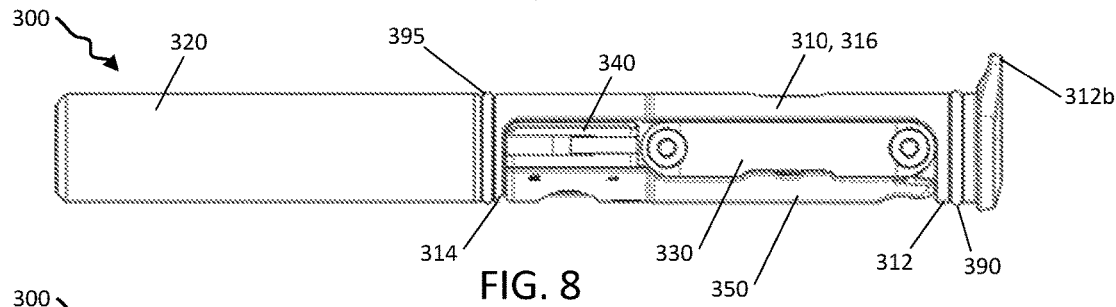
FIG. 8 is a right side view of the device shown in FIG. 6.
Figure 9:
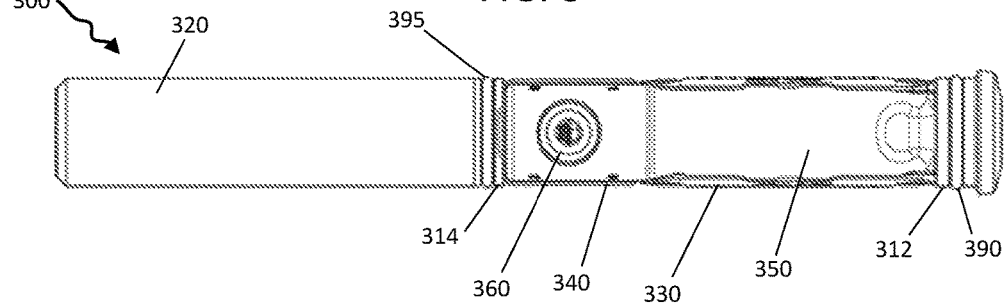
FIG. 9 is a top view of the device shown in FIG. 6.

In some embodiments, device 300 is securely mounted to top cap 500 using a deformable O-ring 390 (FIG. 7). O-ring 390 engages ridge 518a of body 510. An inner diameter of ridge 518a is less than an inner diameter of body 510 adjacent ridge 518a. As device 300 is inserted through aperture 516 of top cap 500, O-ring 390 deforms slightly as it contacts ridge 518a. O-ring 390 is at least partially restored to its natural shape as O-ring passes ridge 518a. Accordingly, ridge 518a acts as a lip to retain O-ring 390 and O-ring 390 sealingly engages device 300 with top cap 500.

In some embodiments, an edge 514a (FIG. 20) of second end 514 of body 510 is rounded (i.e. filleted) or chamfered. Rounded or chamfered edge 514a permits device 300 to be withdrawn from top cap 500 without scraping and/or damaging device 300.

In some embodiments, outer surface 511 of top cap 500 is fully threaded with threads 519. In some embodiments, outer surface 511 is partially threaded with threads 519. Threads 519 extend along outer surface 511 of body 510 from first end 512 partially towards second end 514. In this way, the axial length of body 510 may be configured to reduce the extent that device 300 rattles inside steerer tube 430 when device 300 is installed inside headset assembly 400. Also, since only a portion of top cap 500 is threaded, only a portion of steerer tube 430 needs to threaded (as described elsewhere herein), which preserves the structural integrity of steerer tube 430.

In some embodiments, a lower surface 442 of fork crown 440 defines an aperture (not shown). A plug 490 may be provided to seal crown 440. Plug 490 includes an annular body 491 having a first end 492 and a second end 494. In some embodiments, body 491 defines an aperture 493 extending through plug 490 from first end 492 to second end 494. An outer surface of body 490 includes fins 495. Plug 490 includes an annular flange 496 extending radially outwardly from second end 494 of body 491. In some embodiments, an outer diameter of fins 495 corresponds to an inner diameter of steerer tube 430 adjacent end 432. In some embodiments, an outer diameter of flange 496 is greater than the inner diameter of the crown aperture (not shown). Accordingly, flange 496 is sized to abut against lower surface 442 of fork 420. First surface 492 is configured to receive device 300 and prevent device 300 from rattling inside steerer tube 430 when the corresponding bicycle is in use. In some embodiments, an outer diameter of device 300 corresponds to an inner diameter of plug body 491. In some embodiments, as best shown in FIG. 15, upper end 492 of plug 490 defines at least two tabs 492a for receiving device 300. Tabs 492a allow body 491 of plug 490 to expand to accommodate device 300 and securely mount device 300 within aperture 493. Plug 490 and/or the components thereof may be constructed from a rigid material such as plastic (or other curable material) or metal. Plug 490 and/or the components thereof may be fabricated using machining, forging, blow molding, injection molding, extrusion blow molding, extrusion, dye casting, or a like method. In some embodiments, plug 490 and/or the components thereof may be fabricated using a 3D printer. Plug 490 may be used to receive a lower portion of device 300 to reduce the amount that device 300 moves inside steerer tube 430 when the corresponding bicycle is in use. This minimizes any noise generated by device 300 and/or reduces any damage that may otherwise be caused by device 300 moving inside steerer tube 430.

FIGS. 21-26 show various views of a hand-actuated bicycle pump 600 according to an example embodiment. Device 300 may be mounted inside pump 600. Pump 600 may be mounted to a bicycle frame as conventionally known and/or carried by a user operating a bicycle. Pump 600 includes a pump body 610, a handle 620, and a pump head 630. Handle 620 and pump head 630 are disposed at opposite ends 610a, 610b of pump body 610. Pump body 610 houses a plunger 611 and a piston 612. Plunger 611 is connected at a first end 611a to handle 620 for pump actuation and at a second end 611b opposed to first end 611a to piston 612. In some embodiments, piston 612 includes an O-ring 614. A radial outward edge 613 of piston 612 and/or O-ring 614 engage an inside surface 615 of pump body 610. Pump 600 is hand-actuated as is conventionally known by pumping handle 620 to actuate piston 612 inside pump body 610 to draw air into and displace air from pump body 610 via a one-way valve (not shown). During an up-stroke, piston 612 draws external air into pump body 610. During a down-stroke, piston 612 displaces the air in pump body 610 into a bicycle tire (not shown) via pump head 630.

In the FIGS. 21-26 embodiment, pump 600, pump body 610, handle 620, plunger 611, and piston 612 are substantially tubular and have an annular shape about central axis 602. Handle 620 has a diameter that is greater than a diameter of pump body 610 so that pump body 610 and handle 620 slide telescopically when pump 600 is actuated. In this way, pump 600 has a compact configuration. Plunger 611 has a diameter that is less than a diameter of both pump body 610 and handle 620.

Handle 620 and plunger 611 define an aperture 690. Aperture 690 and a plunger wall 611c define a cavity 699 accessible to a user through aperture 690. An inner diameter of plunger 611 is configured to an outer diameter of device 300. An axial length of plunger 611 is configured to an axial length of device 300. Device 300 may be inserted through aperture 690 and stored inside cavity 699. In some embodiments, device 300 includes one or more deformable O-rings 390 and 395 for sealingly engaging device 300 inside pump 600. In some embodiments, handle 620 defines a flange 620a concentrically aligned with and adjacent to aperture 690. An diameter of flange 620a is less than an inner diameter of plunger 611 proximate flange 620a. As device 300 is inserted into pump 600, O-rings 390 and 395 partially deform as they pass flange 620a. O-ring 390 is at least partially restored to its natural shape after it passes flange 620*a*. Accordingly, flange 620*a* provides resistance to O-ring 390 and keeps O-ring 390 sealingly engaged with plunger wall 611*a*. In this way, device 300 is securely mounted and fluidly sealed inside cavity 699. O-ring 395 may provide added resistance by sealingly engaging plunger wall 611*a* to keep device 300 securely mounted inside cavity 699.

Figure 24:
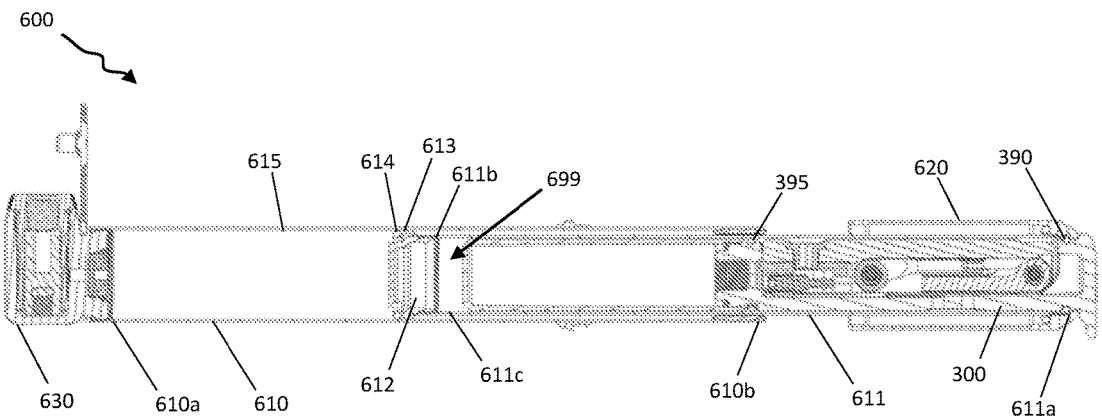
FIG. 24 is a side cross-sectional view of the pump shown in FIG. 21 in a partial up-stroke position, wherein the device shown in FIG. 6 is removeably mounted inside the pump.
Figure 25:
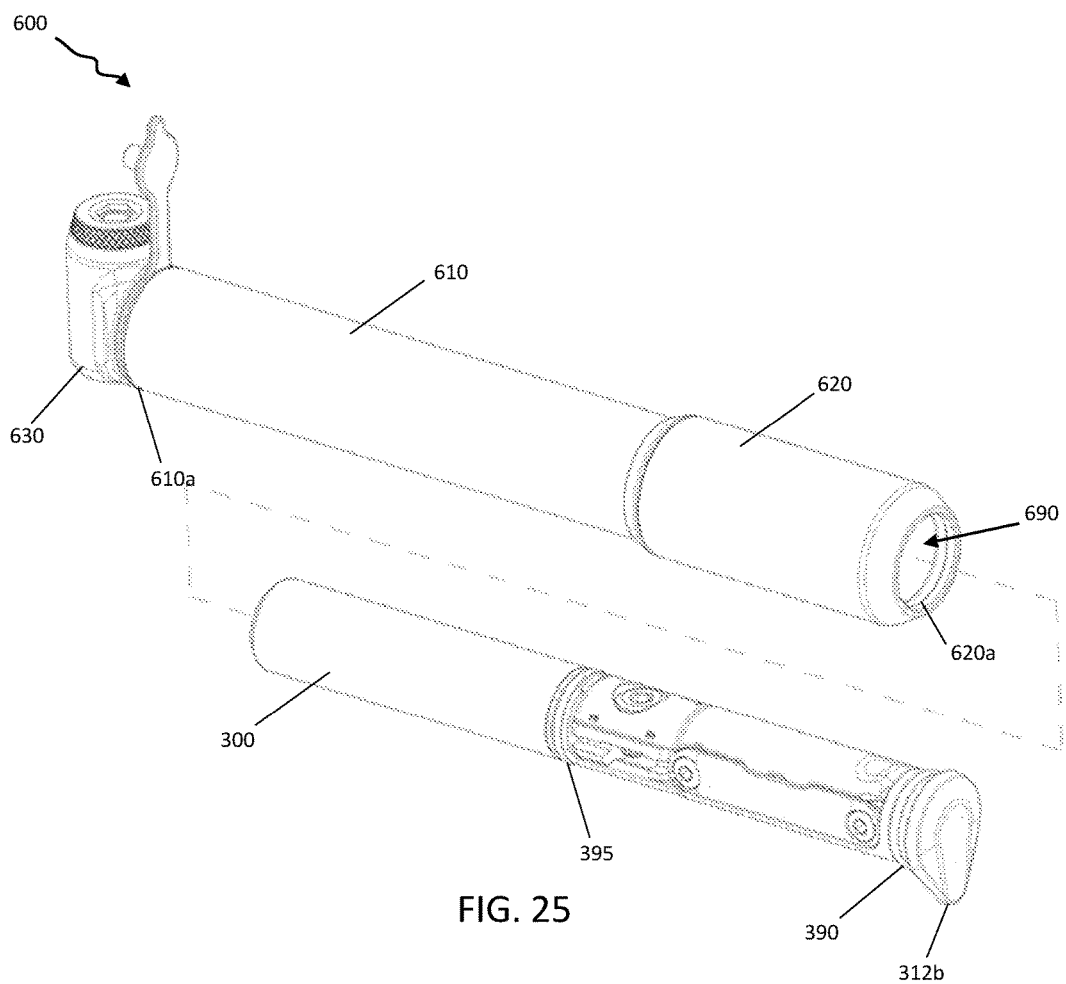
FIG. 25 is a perspective view of the device shown in FIG. 6 mountable inside the bicycle pump shown in FIG. 21.
Figure 26:
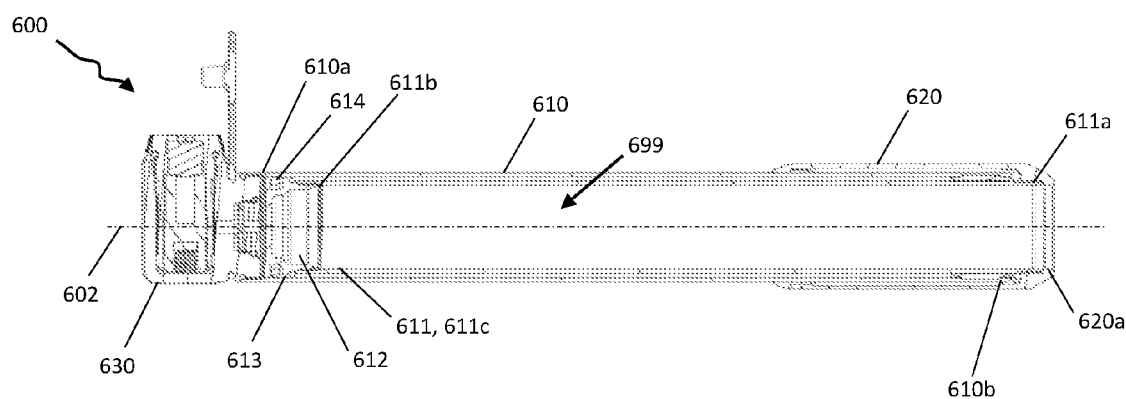
FIG. 26 is a side cross-sectional view of the pump shown in FIG. 21.

The contents of cavity 699 do not impact operation of pump 600. Pump 600 may be actuated to inflate a tire when device 300 is installed inside cavity 699 and when cavity 699 is empty. As best seen in FIGS. 24 and 26, when pump 600 is actuated, piston 612 is able to draw air into and displace air from pump body 610. Actuation of pump 600 to inflate a tire is independent of whether or not device 300 is mounted inside pump 600. In this way, the space inside pump 600 can be used to store device 300 without compromising the function of pump 600. Since actuation of pump 600 is independent of whether or not device 300 is mounted inside cavity 699, the working components of pump 600 (i.e. plunger 611, piston 612, and the one-way valve) are protected from dirt and debris whether or not device 300 is installed inside cavity 699. When stored inside pump 600, device 300 is protected from dirt and debris.

In some embodiments, an outer diameter of device 300 corresponds to an inner diameter of body 510 of top cap 500 and/or an inner diameter of plunger 611 of pump 600. Device 300 may be easily transferred from headset assembly 400 to bicycle pump 600 for storage. When installed in headset assembly 400 or bicycle pump 600, device 300 is kept clean and dry. Headset assembly 400 and pump 600 are fully operable independent of whether or not device 300 is installed therein.

INTERPRETATION OF TERMS

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a substrate, assembly, device, manifold, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments described herein.

Specific examples of systems, methods, and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A bicycle tool storage device comprising:
   an elongate, axially extending body for mounting one or more tools, the body comprising:
   a tool receiving space positioned axially between a first end and a second end of the body;
   a receiving portion configured to removeably receive a detachable member whereby, when that detachable member is attached, it extends axially away from the first end of the body; and
   a flange outwardly extending from a second end of the body
   wherein the one or more tools being removeably positionable within the tool receiving space and when the one or more tools are positioned within the tool receiving space of the body, the bicycle tool storage device is axially insertable into a substantially cylindrical cavity within a bicycle headset assembly, and an outer diameter of the flange is greater than an outer diameter of the substantially cylindrical cavity so that the device is easily removed from the bicycle headset assembly.

2. A bicycle tool storage device according to claim 1, wherein the detachable member comprises a compressed gas cartridge.

3. A bicycle tool storage device according to claim 1, wherein the detachable member comprises a container and wherein an outer diameter of the body and one or more tools removeably mounted to the body corresponds generally to an outer diameter of the container.

4. A bicycle tool storage device according to claim 1, wherein an outer diameter of the device corresponds to an outer diameter of the aperture of a bicycle top cap, and wherein the outer diameter of the flange is greater than the outer diameter of the aperture so that the device is easily removed from the top cap.

5. The bicycle tool storage device of claim 1, wherein the bicycle headset assembly comprises a head tube and the substantial cylindrical cavity is within the head tube.

6. A bicycle tool storage device comprising:
an elongate, axially extending body for mounting one or more tools, the body comprising:
  a tool receiving space positioned axially between a first end and a second end of the body;
  a receiving portion configured to removeably receive a detachable member whereby, when that detachable member is attached, it extends axially away from the first end of the body, and
  wherein the one or more tools being removeably positionable within the tool receiving space and when the one or more tools are positioned within the tool receiving space of the body, the bicycle tool storage device is axially insertable into a substantially cylindrical cavity that is inside a bicycle pump.

7. A bicycle tool storage device, comprising:
an elongate, axially extending body having a first end, a second end spaced axially apart from the first end and a connecting arm extending therebetween, the body comprising a tool receiving space positioned axially between the first end and second end and being at least partially bounded by the connecting arm;
a multi-tool positionable in the tool receiving space axially between the first end and second end, the multi-tool comprising at least one plate and at least a first hexagonal tool pivotally connected to the plate, wherein the multi-tool is removable from the tool receiving space in a lateral direction that is orthogonal to the axial direction; and
wherein when the multi-tool is positioned within the tool receiving space, the bicycle tool storage device is axially insertable into a substantially cylindrical cavity that is inside a bicycle pump.

8. A bicycle tool storage device, comprising:
an elongate, axially extending body having a first end, a second end spaced axially apart from the first end and a connecting arm extending therebetween, the body comprising a tool receiving space positioned axially between the first end and second end and being at least partially bounded by the connecting arm, and a flange outwardly extending from a second end of the body;
a multi-tool positionable in the tool receiving space axially between the first end and second end, the multi-tool comprising at least one plate and at least a first hexagonal tool pivotally connected to the plate, wherein the multi-tool is removable from the tool receiving space in a lateral direction that is orthogonal to the axial direction; and
wherein when the multi-tool is positioned within the tool receiving space, the bicycle tool storage device is axially insertable into a substantially cylindrical cavity within a bicycle headset assembly, and wherein an outer diameter of the flange is greater than an outer diameter of the substantially cylindrical cavity so that the bicycle tool storage device is easily removed from the bicycle headset assembly.

9. A bicycle tool storage device according to claim 8, further comprising a chain breaker removeably positionable axially between the multi-tool and the first end or second end within the tool receiving space.

10. A bicycle tool storage device according to claim 8, further comprising a tire lever removeably positionable laterally adjacent to the multi-tool and within the tool receiving space.

11. A bicycle tool storage device according to claim 10, wherein when the tire lever is positioned in the tool receiving space the multi-tool is disposed laterally between the tire lever and the connecting arm.

12. A bicycle tool storage device according to claim 8, wherein an outer face of the first end comprises a receiving portion that is configured to removeably receive a second portion whereby, when that second portion is attached, it extends axially away from the first end of the body.

13. A bicycle tool storage device according to claim 12, wherein the second portion comprises a compressed gas cartridge.

14. A bicycle tool storage device according to claim 12, wherein the second portion comprises a container having an interior and an open end to provide access to the interior, and wherein connecting the open end of the container to the receiving portion seals the interior of the container.

15. A bicycle tool storage device according to claim 8 wherein the connecting arm comprises at least one aperture configured to a quick connect chain link.

16. A bicycle tool storage device according to claim 8, wherein an outer diameter of the device corresponds to an outer diameter of the aperture of a bicycle top cap, and wherein the outer diameter of the flange is greater than the outer diameter of the aperture so that the device is easily removed from the top cap.

17. The bicycle tool storage device of claim 8, wherein the bicycle headset assembly comprises a head tube and the substantial cylindrical cavity is within the head tube.

* * * * *